(12) United States Patent
Wright

(10) Patent No.: US 9,942,639 B2
(45) Date of Patent: Apr. 10, 2018

(54) ARTICULATING, SELF RETAINED ON-WALL BRACKET MOUNTING SYSTEM

(71) Applicant: Doug Stuart Wright, Coeur d'Alene, ID (US)

(72) Inventor: Doug Stuart Wright, Coeur d'Alene, ID (US)

( * ) Notice: Subject to any disclaimer, the term of this patent is extended or adjusted under 35 U.S.C. 154(b) by 0 days.

(21) Appl. No.: 15/390,047

(22) Filed: Dec. 23, 2016

(65) Prior Publication Data

US 2017/0188123 A1    Jun. 29, 2017

Related U.S. Application Data

(60) Provisional application No. 62/387,536, filed on Dec. 23, 2015.

(51) Int. Cl.
*E04G 3/00*    (2006.01)
*H04R 1/02*    (2006.01)
*F16M 13/02*   (2006.01)

(52) U.S. Cl.
CPC ............. *H04R 1/026* (2013.01); *F16M 13/02* (2013.01); *F16M 2200/021* (2013.01); *H04R 2201/021* (2013.01)

(58) Field of Classification Search
CPC ........ H04R 1/026; H04R 1/025; F16M 13/02; F16M 2200/021
USPC ............................... 248/278.1; 381/386, 387
See application file for complete search history.

(56) References Cited

U.S. PATENT DOCUMENTS

| | | | | |
|---|---|---|---|---|
| 7,455,271 B2* | 11/2008 | Pincek | .................. | F16M 11/14 248/220.21 |
| 8,582,798 B2* | 11/2013 | Staley | .................... | H04R 1/026 381/387 |
| 2005/0100187 A1* | 5/2005 | Yang | ...................... | H04R 1/026 381/386 |

* cited by examiner

*Primary Examiner* — Todd M Epps
(74) *Attorney, Agent, or Firm* — Loza & Loza, LLP; Julio Loza

(57) ABSTRACT

This invention is a mounting system for a loudspeaker system that is capable of positioning and re-positioning the box-like device of the loudspeaker without requiring the use of any retaining/tensioning fasteners. A bracket facilitates constraining the positioning and repositioning for the roll and pitch axes while simultaneously providing audible feedback angular movement indication that enable vertical and horizontal orientation with respect both to the installation environment and to match its positioning to other like installed systems.

15 Claims, 22 Drawing Sheets

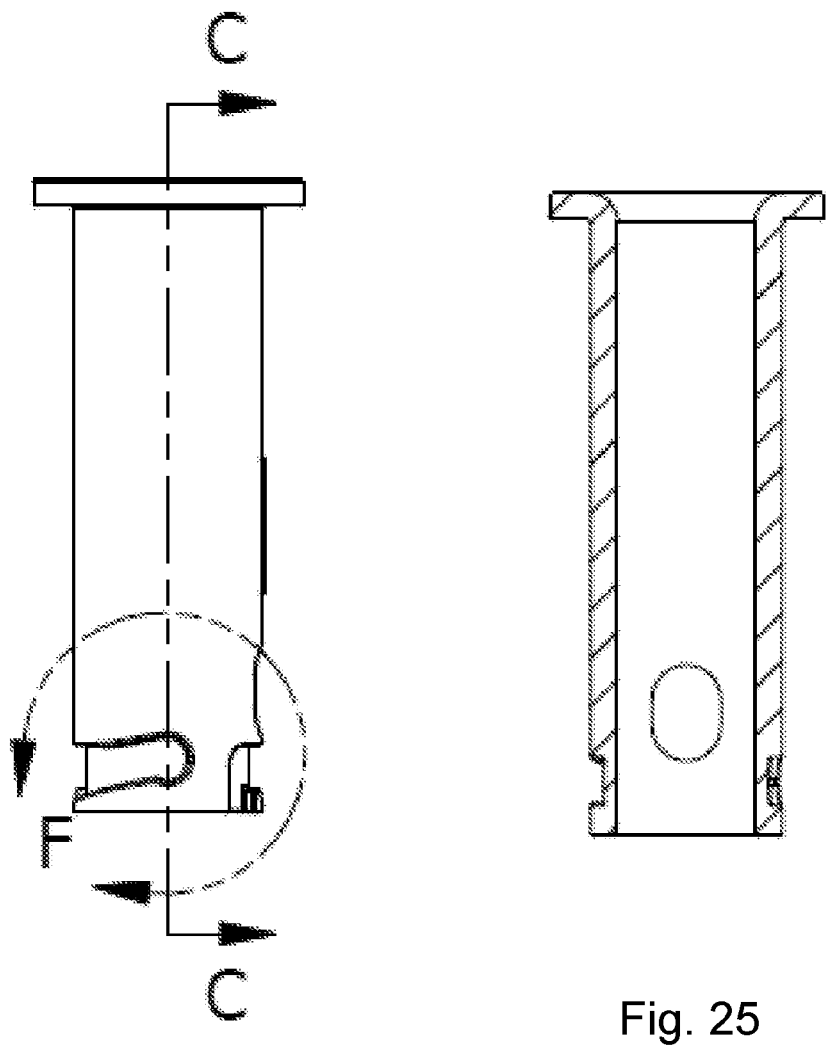
Fig. 24
Fig. 25
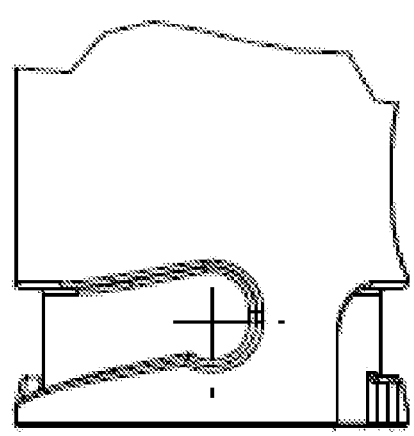
Fig. 26

ARTICULATING, SELF RETAINED ON-WALL BRACKET MOUNTING SYSTEM

CROSS-REFERENCE TO RELATED APPLICATIONS

This application claims priority to and the benefit of U.S. Provisional Application Ser. No. 62/387,536, entitled "ARTICULATING, SELF RETAINED ON-WALL BRACKET MOUNTING SYSTEM" filed on Dec. 23, 2015, the entire contents of which is incorporated herein by reference.

BACKGROUND OF THE INVENTION

1. Field of the Invention

This invention provides a constrained, 2-Axis, articulating, self-retained and position maintaining, on-wall bracket mounting system. Specifically, this invention enables the mounting of diverse shaped and various sized devices on walls such as the mounting of loudspeaker systems.

2. Related Art

Tens of millions of on-wall loudspeaker systems have been installed the world over and all of them present their installers a series of installation challenges that fall into two broad categories. The first is aligning it with the environment into which it is being installed and the second is the method by which it is secured or retained into the preferred position. While many of these systems feature only a single axis mounting bracket system, thereby simplifying the alignment issue, they still mostly require the installer to manually insert and activate some kind of threaded fastening system and then to make a "best guess" as to how one system aligns or duplicates the positioning of a second, third or more systems. The alignment/retention issue becomes even more challenging when the widely employed "ball and socket" system (Omni-Mount® type) is used as it provides the installer with few if any limitations to its potential orientation. While some might view this as an inherent advantage, in reality if the installation requires at least a modicum of consistent symmetry between the various loudspeakers and their environment, then the ball and socket method becomes substantially more bothersome and expensive to install. And all of the legacy ball and socket systems require the installer to manually install and activate the aforementioned threaded fastening system, usually while perched precariously high up a ladder, holding the loudspeaker system in the desire position with one hand and a screwdriver in the other hand, all while trying to insert the screwdriver into the tensioning fastener's drive head which in invariably located in some dark, awkward, difficult to find location.

The invention disclosed circumvents the aforementioned difficulties. It constrains movements to just two axes, eliminating the tilted loudspeaker syndrome associated with ball and socket systems. It does not require the installer to engage with any threaded fastening device to retain/tension the loudspeaker in the desired position and it provides "clicks" that correspond to specific degrees of movement, that when counted, telegraph just how far the loudspeaker has been moved along either of two axes (e.g. 10 clicks equal 30 degrees of movement) or in some combination of the two. Simply using their hands alone the installer is able to position/re-position the loudspeaker exactly into the desired orientation. Subsequently, directing a plurality of loudspeakers using the same "click-count" procedure ensures that all are aligned exactly the same. The invention(s) described also enable much larger angular movements than do more traditional approaches while keeping the loudspeaker mounted closely to the wall's surface. In addition, because it is possible for an unauthorized party to reposition the loudspeaker the design incorporates a locking feature that rigidly locks the loudspeaker into the position specified by the original installer. The nature of the design also provides for simple "scaling" of the design for larger (e.g. heavier) or smaller systems and a hollow shaft is provided that facilitates wire routing.

SUMMARY

This invention provides an easily managed wall-mounted loudspeakers system mount so that the loudspeaker direction of sound propagation can be directed toward a predetermined target and to be able to quickly and reliably match the desired angularity between two or more related wall-mounted loudspeakers.

This invention is a mounting system for a loudspeaker system that is capable of positioning and re-positioning the box-like device of the loudspeaker without requiring the use of any retaining/tensioning fasteners. A bracket facilitates constraining the positioning and repositioning for the roll and pitch axes while simultaneously providing audible feedback angular movement indication that enable vertical and horizontal orientation with respect both to the installation environment and to match its positioning to other like installed systems.

Other systems, methods, features, and advantages of the invention will be or will become apparent to one with skill in the art upon examination of the following figures and detailed description. It is intended that all such additional systems, methods, features and advantages be included within this description, be within the scope of the invention, and be protected by the accompanying claims.

DETAILED DESCRIPTION OF THE DRAWINGS

The components in the figures are not necessarily to scale, emphasis being placed instead upon illustrating the principles of the invention. In the figures, like reference numerals designate corresponding parts throughout the different views.

FIG. 24 is a side view of a tensioning shaft.

FIG. 25 is a side, cross sectional view of a tensioning shaft taken along C-C of FIG. 24.

FIG. 26 is a side, cross sectional view of a tensioning shaft taken along F-F of FIG. 24.

DETAILED DESCRIPTION

Figure 1:
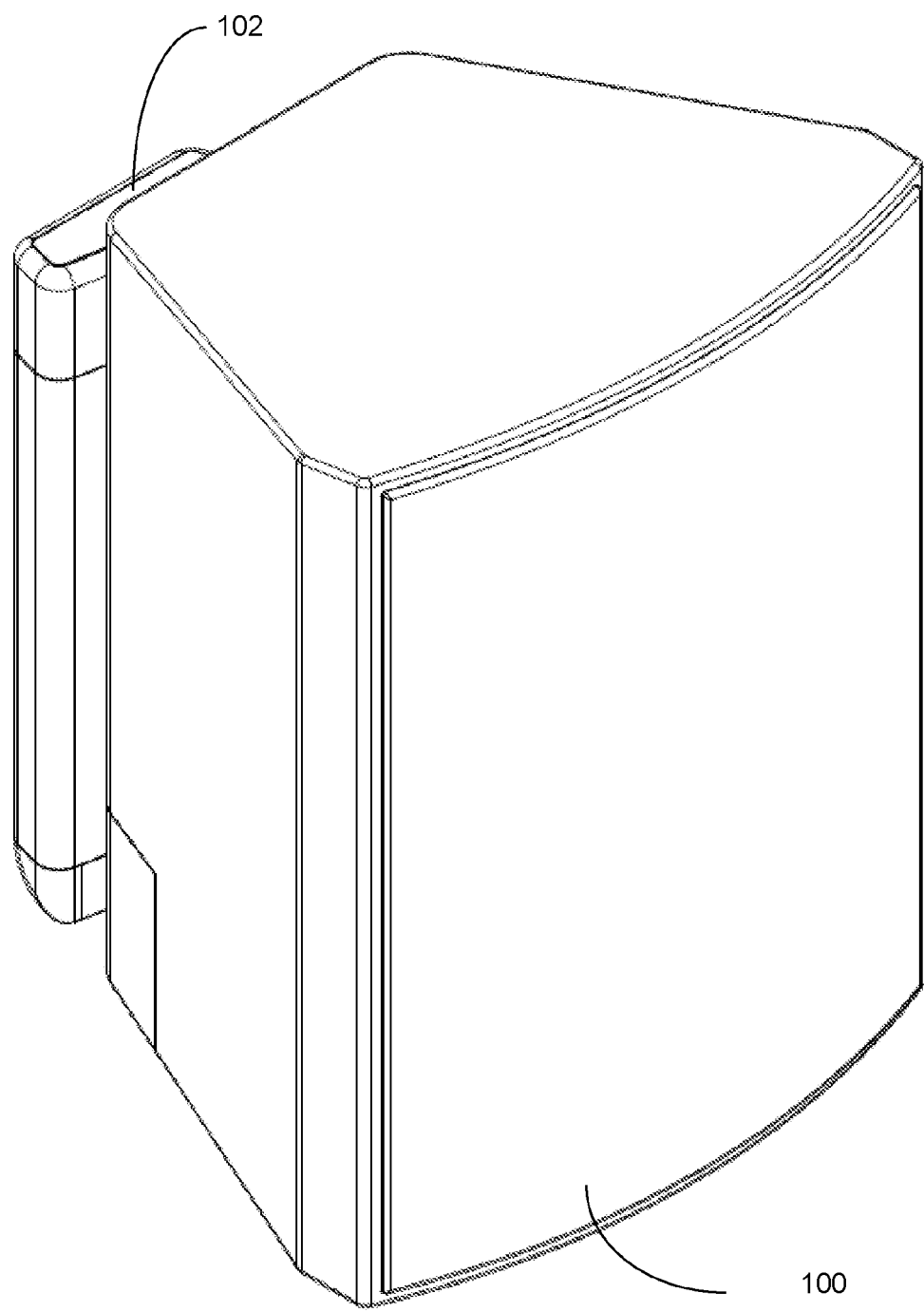
FIG. 1 is a perspective view illustrating a front isometric view of an on-wall loudspeaker system.

FIG. 1 is a perspective view illustrating a front isometric view of an on-wall loudspeaker system. The loudspeaker 100 may be mounted to a wall via a mounting system 102.

Figure 2:
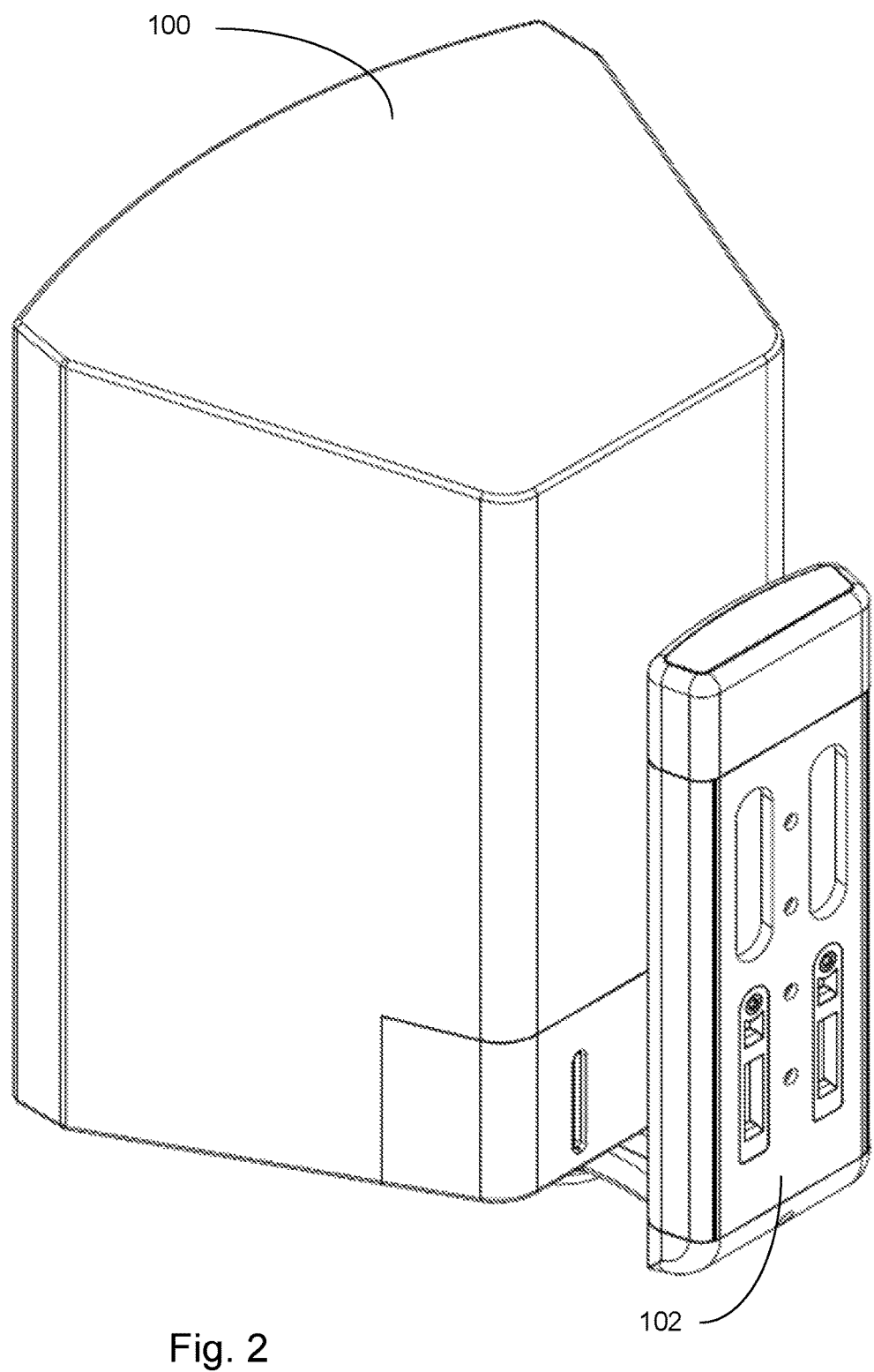
FIG. 2 is a perspective view illustrating a rear isometric view of an on-wall loudspeaker system.

FIG. 2 is a perspective view illustrating a rear view of an on-wall loudspeaker system. The loudspeaker 100 may be mounted to a wall or ceiling by the mounting bracket 102.

Figure 3:
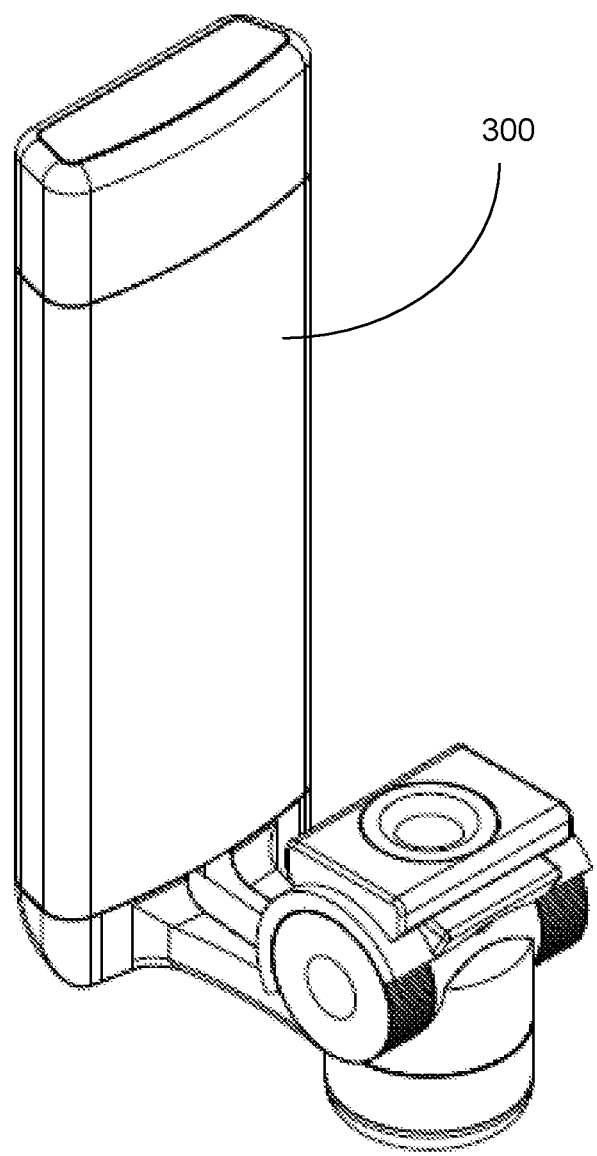
FIG. 3 is a perspective view illustrating the mounting bracket.

FIG. 3 is a perspective view illustrating the mounting bracket. The mounting bracket 300 has two axis controls that allows a device such as a loudspeaker to rotate its pitch or roll.

Figure 4:
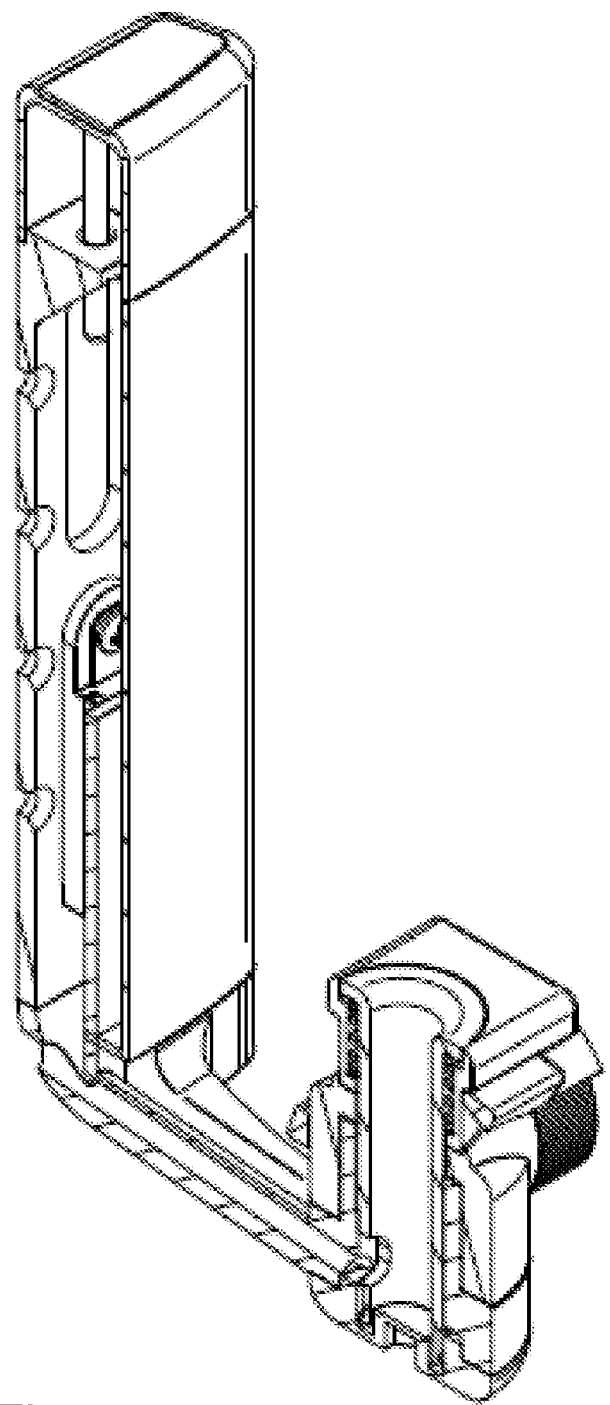
FIG. 4 is a perspective cut away view illustrating the mounting bracket.

FIG. 4 is a perspective view illustrating the mounting bracket with a cut away of part of the mount.

Figure 5:
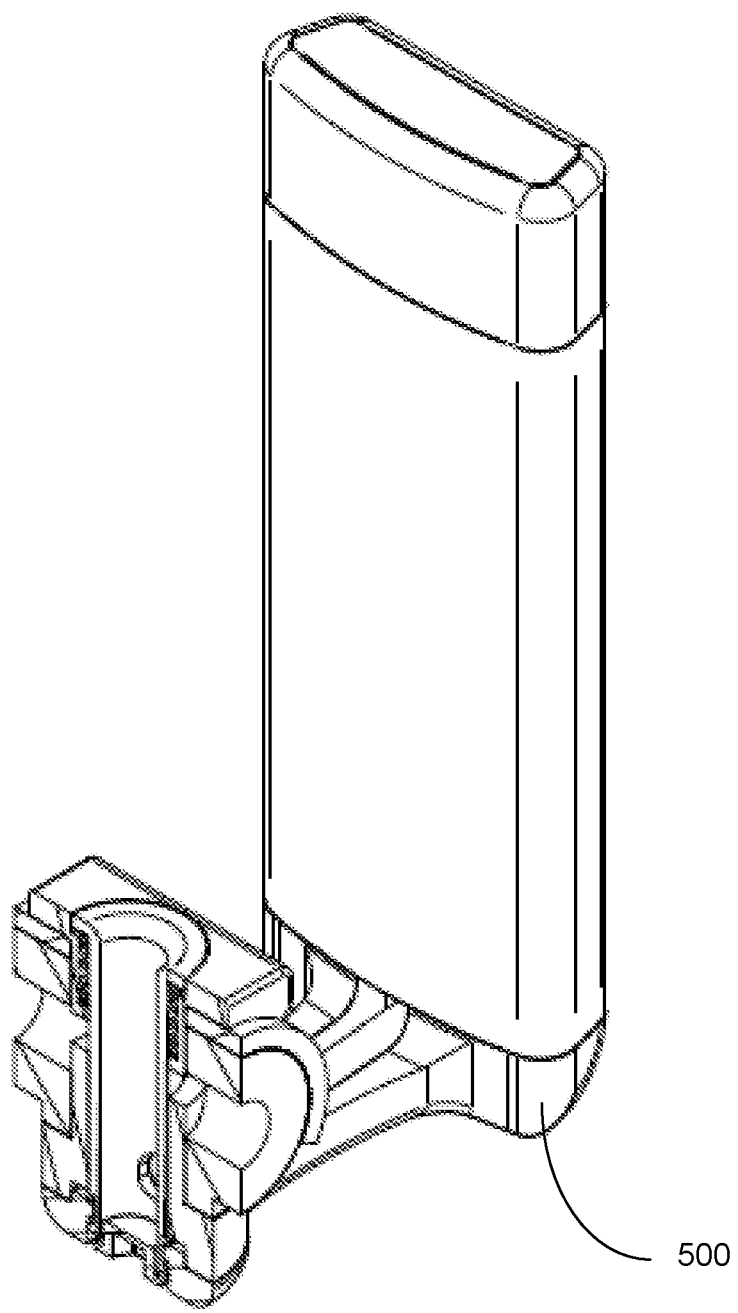
FIG. 5 is a perspective view illustrating the mounting bracket with a cut away of part of the mount.

FIG. 5 is a perspective view illustrating the mounting bracket with a cut away of part of the mount.

Figure 6:
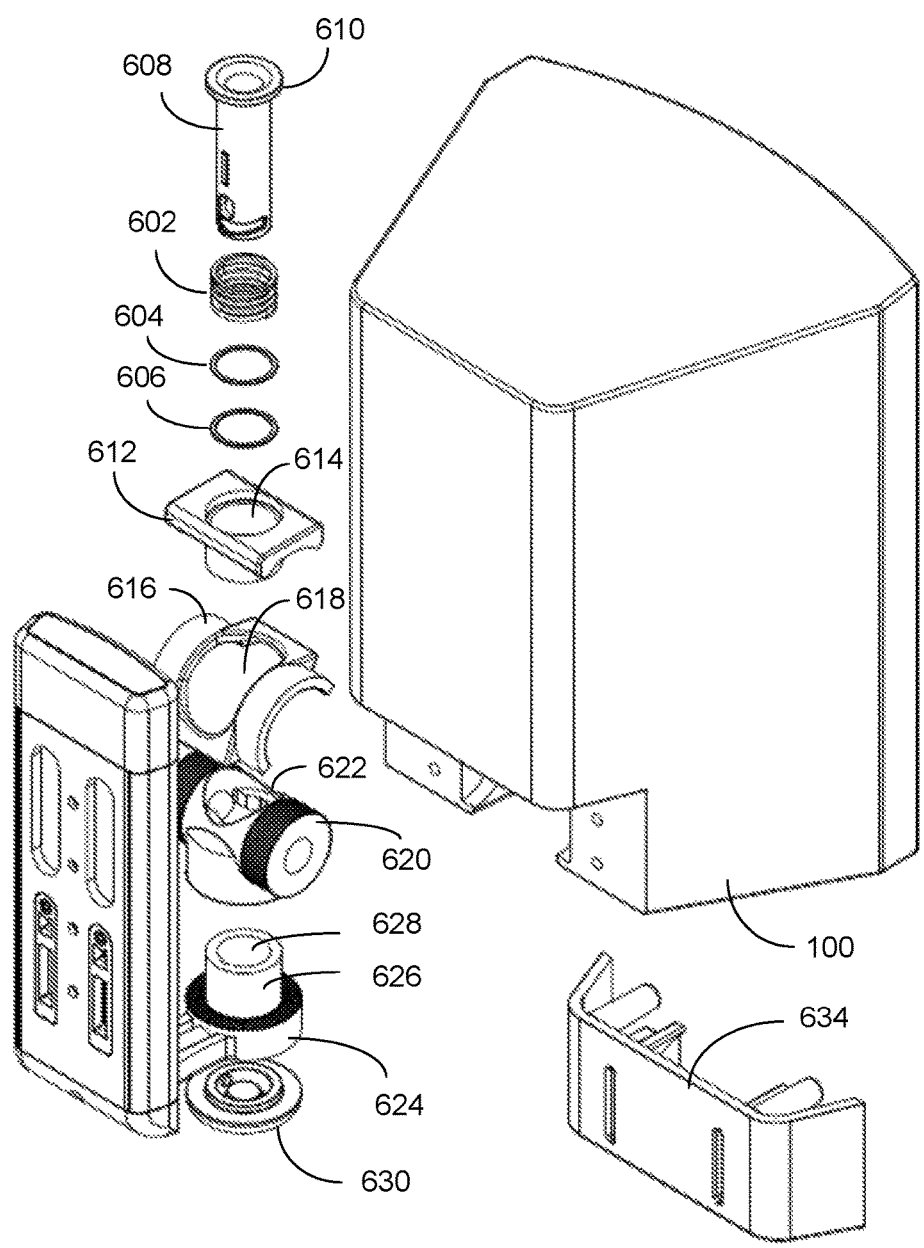
FIG. 6 is an exploded rear view of the mounting system.

FIG. 6 is an exploded rear view of the mounting system. The mounting bracket 102 comprises a spring 602 and two polished washers 604 and 606 that may be inserted over a hollow, flanged shaft 608 where an end surface of the spring 602 is seated on to the hollow, flanged shaft's flange surface 610. The two washers 604 and 606 seat against the other end surface of the spring 602. The assembly of the hollow, flanged shaft 608, the spring 602 and the two polished washers 604 and 606 are then inserted though the sliding collar 612 through hole 614, then through the cradle's 616 oblong hole 618, then through the knuckle's 620 large roll axis through hole 622, then though the primary bracket's 624 hollow round shaft's 626 through hole 628, then lastly it is rotationally linked with a retaining/tensioning nut 630. The mounting bracket can be attached to a loudspeaker 100 and secured by protective plate 634.

Figures 7, 8:
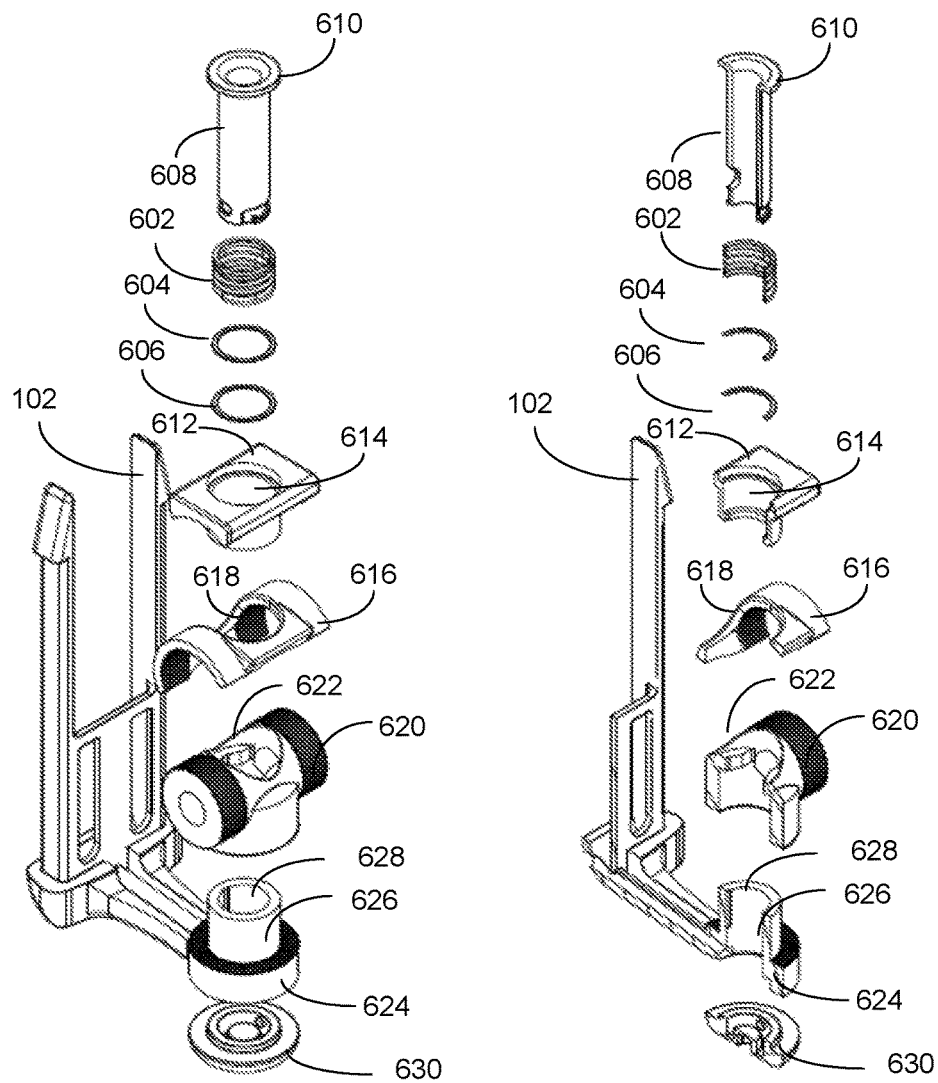
FIG. 7 is an exploded view illustrating the components of the mounting system.
FIG. 8 is an exploded, cut away view illustrating one axis of the components for the mounting system.

FIG. 7 is an exploded view illustrating the components of the mounting system. The mounting bracket comprises a mounting bracket 102, a spring 602 and two polished washers 604 and 606 that may be inserted over a hollow, flanged shaft 608 where an end surface of the spring 602 is seated on to the hollow, flanged shaft's flange surface 610. The two washers 604 and 606 seat against the other end surface of the spring 602. The assembly of the hollow, flanged shaft 608, the spring 602 and the two polished washers 604 and 606 are then inserted though the sliding collar 612 through hole 614, then through the cradle's 616 oblong hole 618, then through the knuckle's 620 large roll axis through hole 622, then though the primary bracket's 624 hollow round shaft's 626 through hole 628, then lastly it is rotationally linked with a retaining/tensioning nut 630.

FIG. 8 is an exploded, cut away view illustrating one axis of the components for the mounting system. The mounting bracket comprises a mounting bracket 102, a spring 602 and two polished washers 604 and 606 that may be inserted over a hollow, flanged shaft 808 where an end surface of the spring 602 is seated on to the hollow, flanged shaft's flange surface 610. The two washers 604 and 606 seat against the other end surface of the spring 602. The assembly of the hollow, flanged shaft 608, the spring 602 and the two polished washers 604 and 606 are then inserted though the sliding collar 612 through hole 614, then through the cradle's 616 oblong hole 618, then through the knuckle's 620 large roll axis through hole 622, then though the primary bracket's 626 hollow round shaft's 626 through hole 628, then lastly it is rotationally linked with a retaining/tensioning nut 630.

Figure 9:
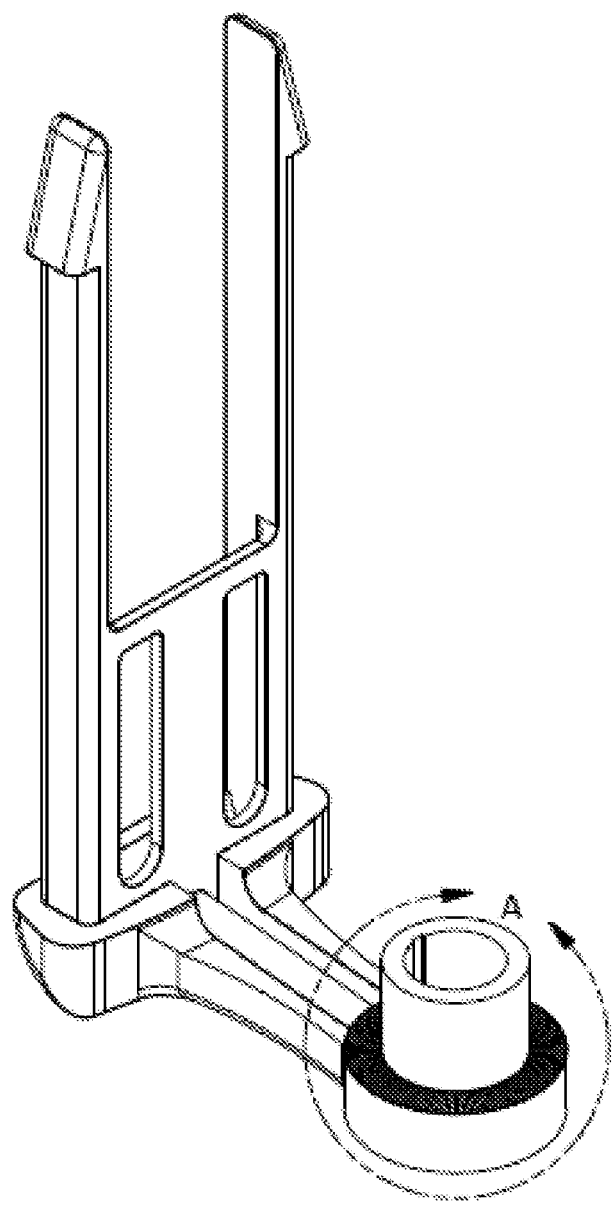
FIG. 9 is a perspective view illustrating the primary support bracket.

FIG. 9 is a perspective view illustrating the primary support bracket.

Figure 10:
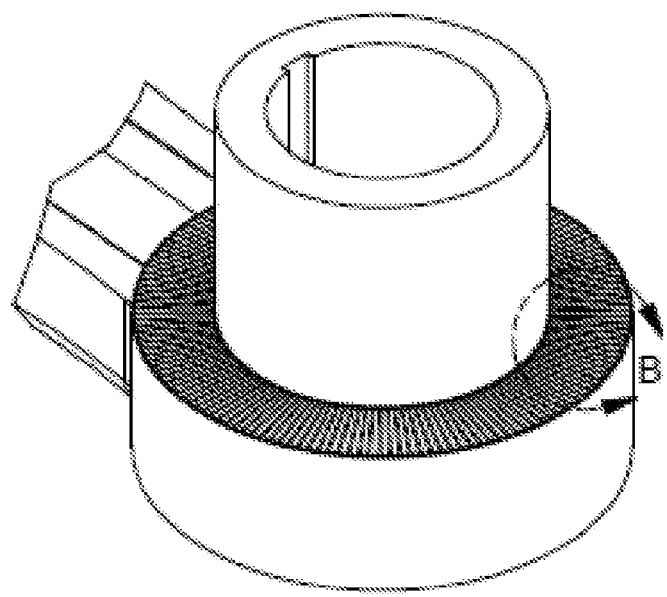
FIG. 10 is a perspective view illustrating the primary support bracket planar slots.

FIG. 10 is a perspective view illustrating the primary support bracket planar slots.

Figure 11:
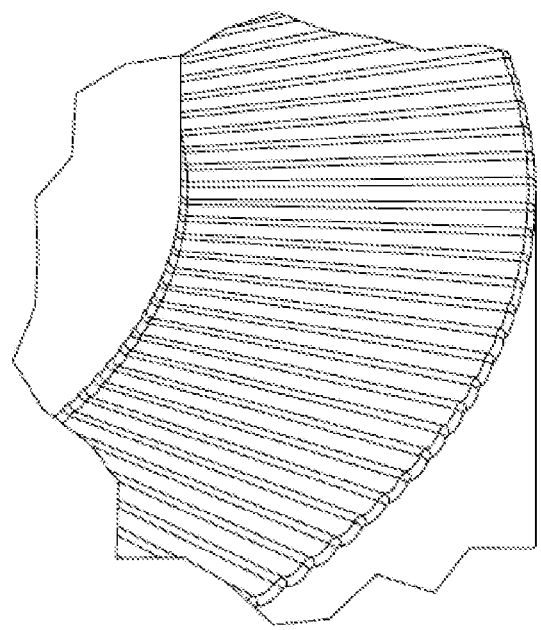
FIG. 11 is a perspective, zoomed in view illustrating the primary support bracket planar slots.

FIG. 11 is a perspective, zoomed in view illustrating the primary support bracket planar slots.

Figure 12:
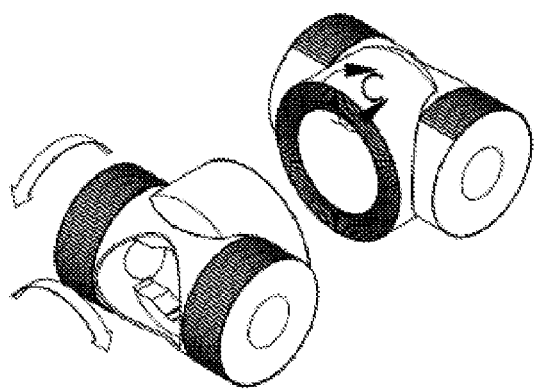
FIG. 12 is a perspective view illustrating the "T" shaped knuckle.

FIG. 12 is a perspective view illustrating the "T" shaped knuckle. The invention is an articulated mounting system that employs semicircular and circular arrays of closely mated ribs and slots, with the semicircular rib/slots being arrayed cylindrically around a hypothetical x-axis ("pitch axis") which typically aligns with the largest or longest dimension of any particular assembly) and the circular rib/slots in a planar fashion on a face perpendicular to the y-axis ("roll axis"). The semicircular cylindrical set of ribs/slots are arrayed around one axis of a "T" shaped "knuckle" that fits into a matching and also cylindrical "cradle", where the ribs reside on an outside annular surface of the knuckle and the slots on the inside surface of the cradle. This corresponds with the pitch axis. The flat or planar array rib/slots control rotations around a roll axis. These elements are held in the desired proximity to one another by additional mechanisms or feature sets that apply alignment and variable amounts of retaining force.

Figure 13:
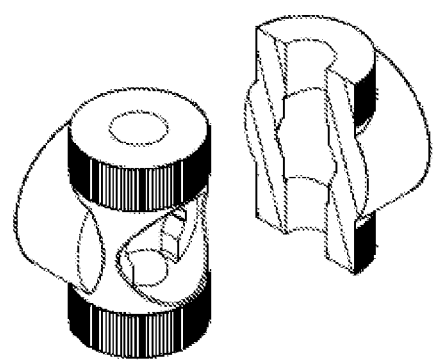
FIG. 13 is a perspective and cut away view illustrating the "T" shaped knuckle.

FIG. 13 is a perspective and cut away view illustrating the "T" shaped knuckle. One key to the invention's features is the ability to variably and predictably articulate the engagement and/or disengagement of the mating rib arrays around pitch and roll axes. These arrays are held in contact with one another via a variable tensioning device such as a spring that by the nature of its variability allows the rib/slots to axially disengage only when a force larger than the force applied by the spring is overcome by some outside force—in this case the installer's actions to reposition the angularity of the bracket. By varying the rate of the spring and the sizes and circumference of the mating rib arrays different sizes and masses of mounted devices can easily be accommodated.

To provide axial structural support for the roll axis, the knuckle is matted and inserted onto a hollow round shaft integrated into the primary bracket, via a round bearing surface. The cradle mates with and wraps around the knuckle's pitch axis such that the centerlines of both the knuckle's and the cradle's pitch axis align thereby allowing the rib/slots to engage.

A hollow protruding shaft integrated into a sliding collar inserts though an oblong slot shape in the cradle that enables the sliding collar to axially rotate to the length limits of the oblong slot. When the sliding collar is inserted into the cradle's oblong slot the sliding collar is able to slide or rotate around the knuckle's pitch axis. The length of the oblong slot is the primary enabler/limiter of the bracket's pitch motions. Smooth cylindrical surfaces are formed on the inside radius of a sliding collar that are mated over matching cylindrical surfaces found on the outside of the cradle. These surfaces create the principle moveable pitch axis interface between the mounted device's enclosure assembly and the wall's "immovable" mounting surface.

Figure 14:
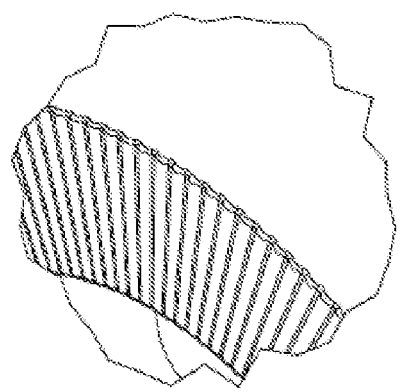
FIG. 14 is a perspective view along C-C of FIG. 13 illustrating the knuckle's ribs.

FIG. 14 is a perspective view along C-C of FIG. 12 illustrating the knuckle's ribs.

Figure 15:
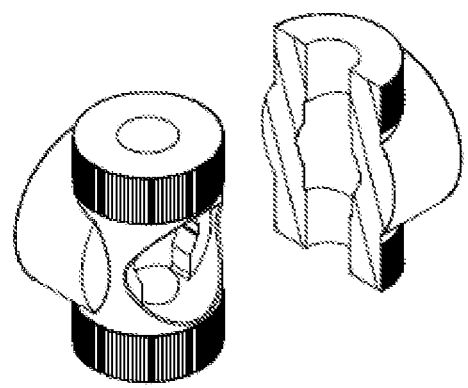
FIG. 15 is a perspective and cut away view illustrating the "T" shaped knuckle.

FIG. 15 is a perspective and cut away view illustrating the "T" shaped knuckle.

Figure 16:
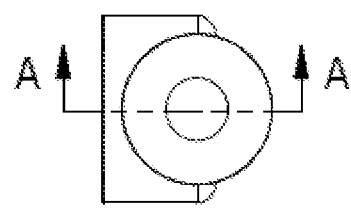
FIG. 16 is a top view illustrating the "T" shaped knuckle.

FIG. 16 is a top view illustrating the "T" shaped knuckle.

Figure 17:
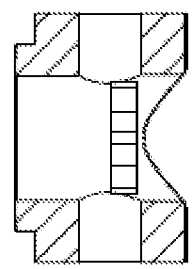
FIG. 17 is a cut away view of the "T" shaped knuckle taken along A-A of FIG. 16.

FIG. 17 is a cut away view of the "T" shaped knuckle taken along A-A of FIG. 16.

Figure 18:
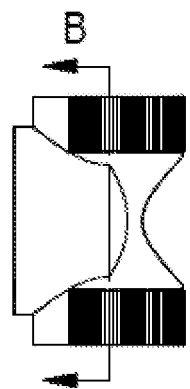
FIG. 18 is a side view illustrating the "T" shaped knuckle.

FIG. 18 is a side view illustrating the "T" shaped knuckle.

Figure 19:
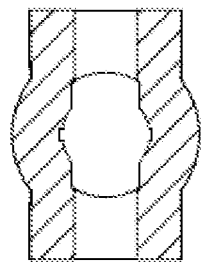
FIG. 19 is a cut away view of the "T" shaped knuckle taken along B-B of FIG. 18.

FIG. 19 is a cut away view of the "T" shaped knuckle taken along B-B of FIG. 18.

Figure 20:
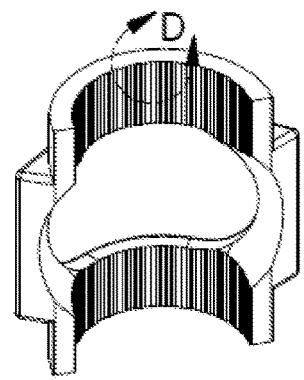
FIG. 20 is a perspective view of a cradle.

FIG. 20 is a perspective view of a cradle.

Figure 21:
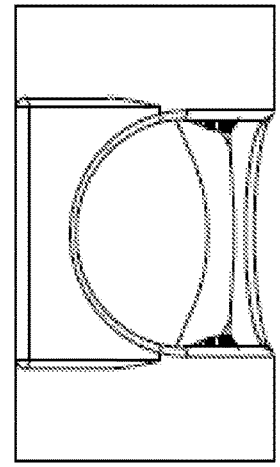
FIG. 21 is a side view of a cradle.

FIG. 21 is a side view of a cradle.

Figure 22:
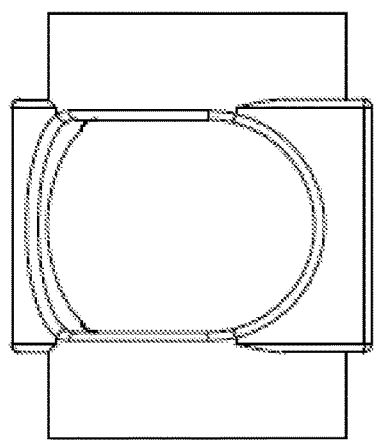
FIG. 22 is a top view of a cradle.

FIG. 22 is a top view of a cradle.

Figure 23:
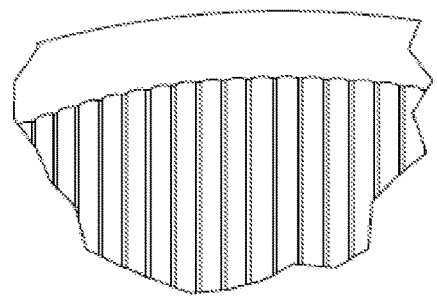
FIG. 23 is a perspective view of a cradle ribs.

FIG. 23 is a perspective view of a cradle ribs.

FIG. 24 is a side view of a tensioning shaft.

FIG. 25 is a side, cross sectional view of a tensioning shaft taken along C-C of FIG. 25.

FIG. 26 is a side, cross sectional view of a tensioning shaft taken along F-F of FIG. 24.

Figure 27:
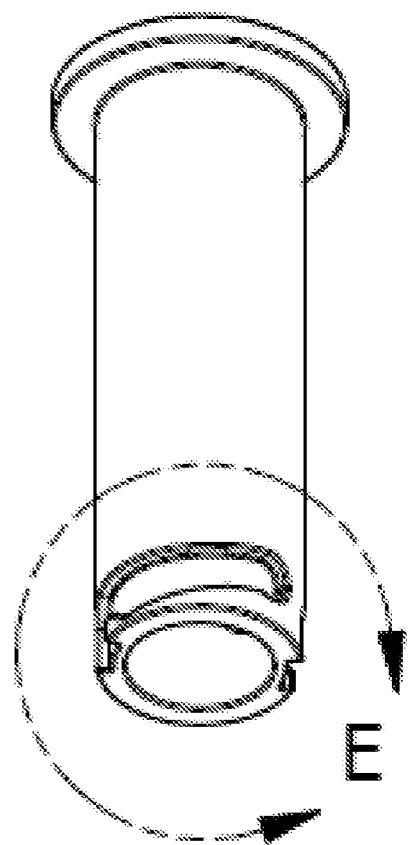
FIG. 27 is a perspective view of a tensioning shaft taken.

FIG. 27 is a perspective view of a tensioning shaft taken.

Figure 28:
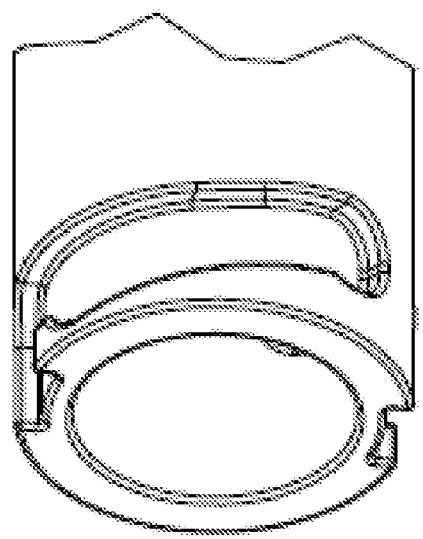
FIG. 28 is a perspective view of a tensioning shaft taken along E-E of FIG. 27.

FIG. 28 is a perspective view of a tensioning shaft taken along E-E of FIG. 27.

Figure 29:
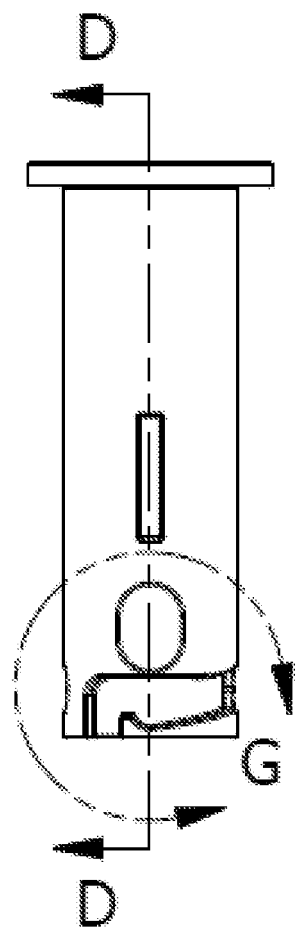
FIG. 29 is a side view of a tensioning shaft.

FIG. 29 is a side view of a tensioning shaft.

Figure 30:
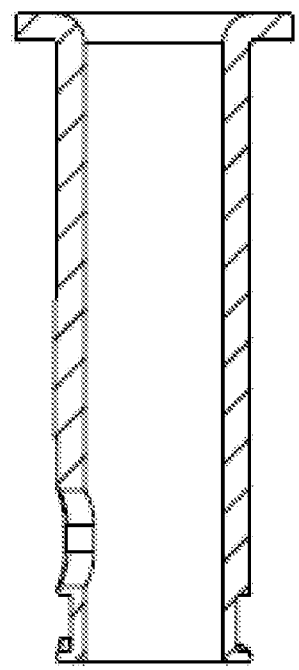
FIG. 30 is a side cut away view of a tensioning shaft taken along D-D of FIG. 29.

FIG. 30 is a side cut away view of a tensioning shaft taken along D-D of FIG. 29.

Figure 31:
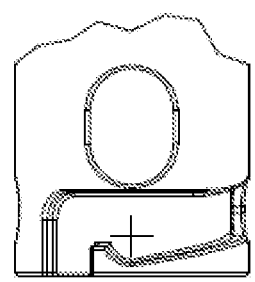
FIG. 31 is a side view of a tensioning shaft taken along G-G of FIG. 29.

FIG. 31 is a side view of a tensioning shaft taken along G-G of FIG. 29.

Figure 32:
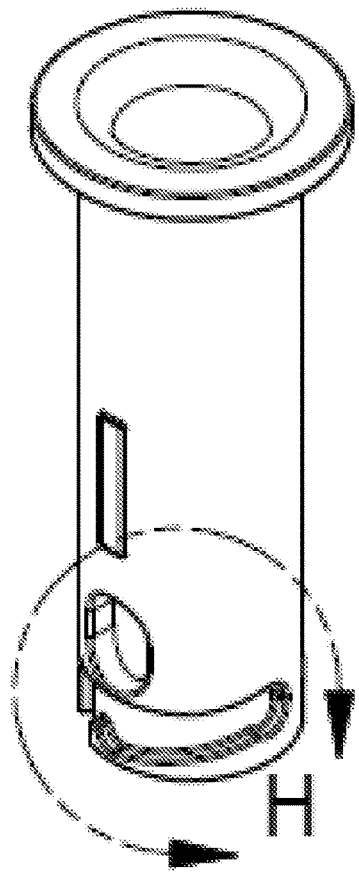
FIG. 32 is a perspective view of a tensioning shaft.

FIG. 32 is a perspective view of a tensioning shaft.

Figure 33:
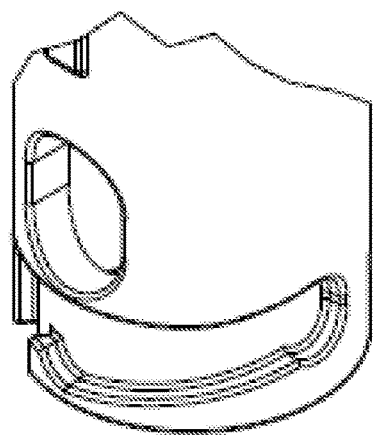
FIG. 33 is a perspective view of a tensioning shaft taken along H-H of FIG. 32.

FIG. 33 is a perspective view of a tensioning shaft taken along H-H of FIG. 32.

Figure 34:
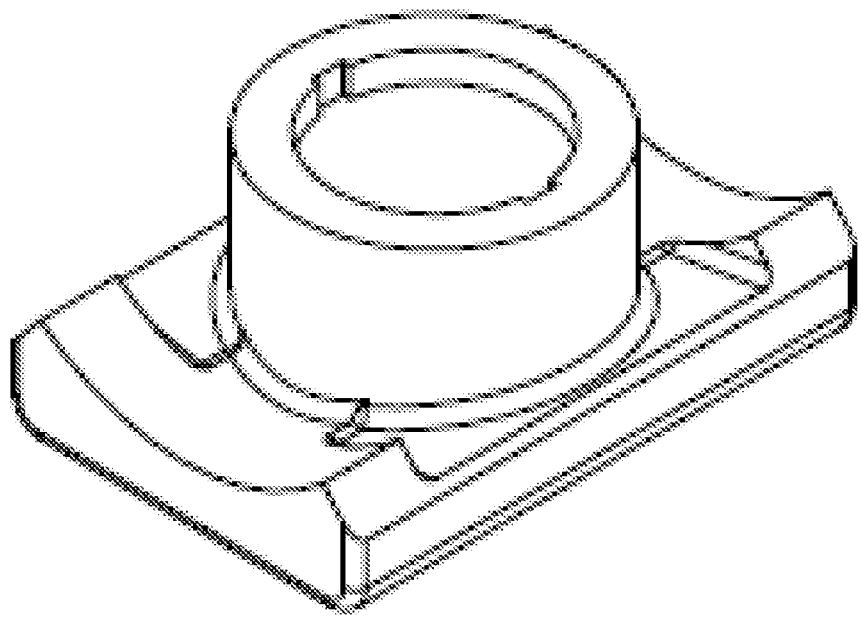
FIG. 34 is a perspective view illustrating a sliding nut.

FIG. 34 is a perspective view illustrating a sliding nut.

Figure 35:
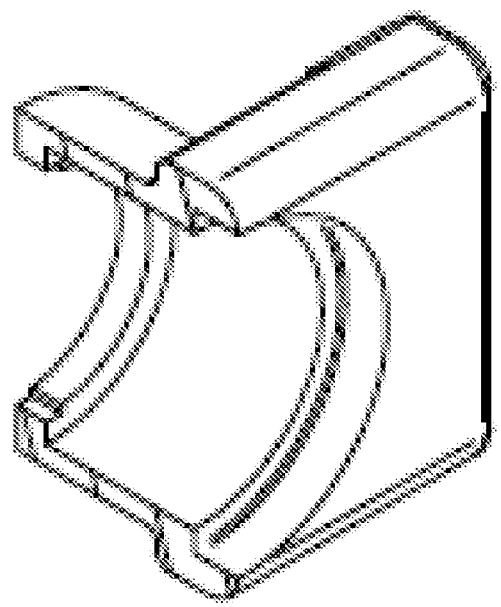
FIG. 35 is a perspective, cut away view illustrating a sliding nut.

FIG. 35 is a perspective, cut away view illustrating a sliding nut.

Figure 36:
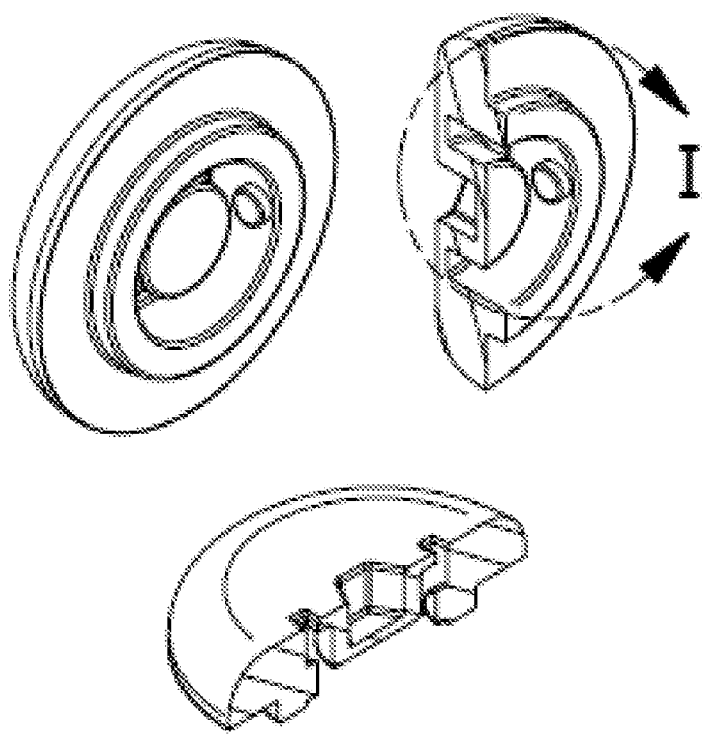
FIG. 36 is a perspective and cut away view of a retaining/tensioning nut.

FIG. 36 is a perspective and cut away view of a retaining/tensioning nut.

Figure 37:
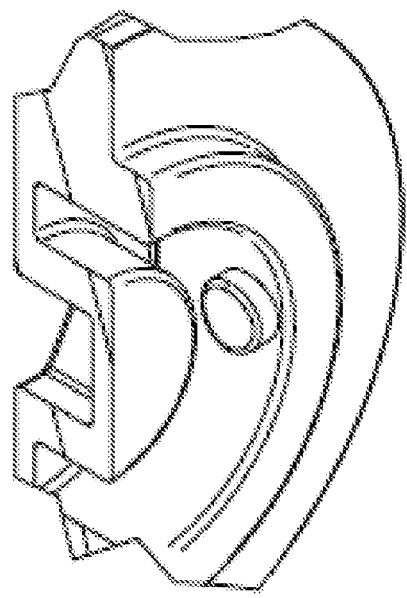
FIG. 37 is a perspective and cut away view of a retaining/tensioning nut.

FIG. 37 is a perspective and cut away view of a retaining/tensioning nut.

Figure 38:
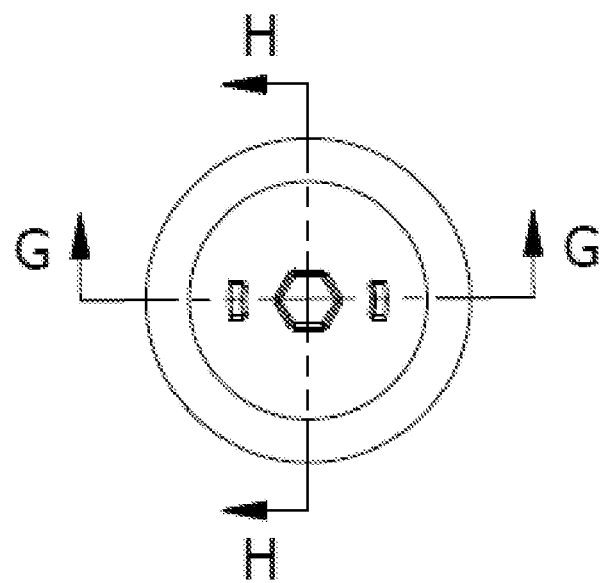
FIG. 38 is a perspective and cut away view of a retaining/tensioning nut.

FIG. 38 is a perspective and cut away view of a retaining/tensioning nut.

Figure 39:
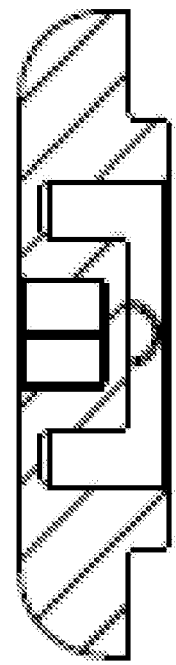
FIG. 39 is a perspective and cut away view of a retaining/tensioning nut.

FIG. 39 is a perspective and cut away view of a retaining/tensioning nut.

Figure 40:
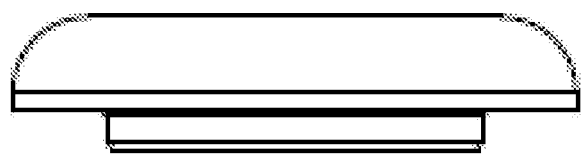
FIG. 40 is a perspective and cut away view of a retaining/tensioning nut.

FIG. 40 is a perspective and cut away view of a retaining/tensioning nut.

Figure 41:
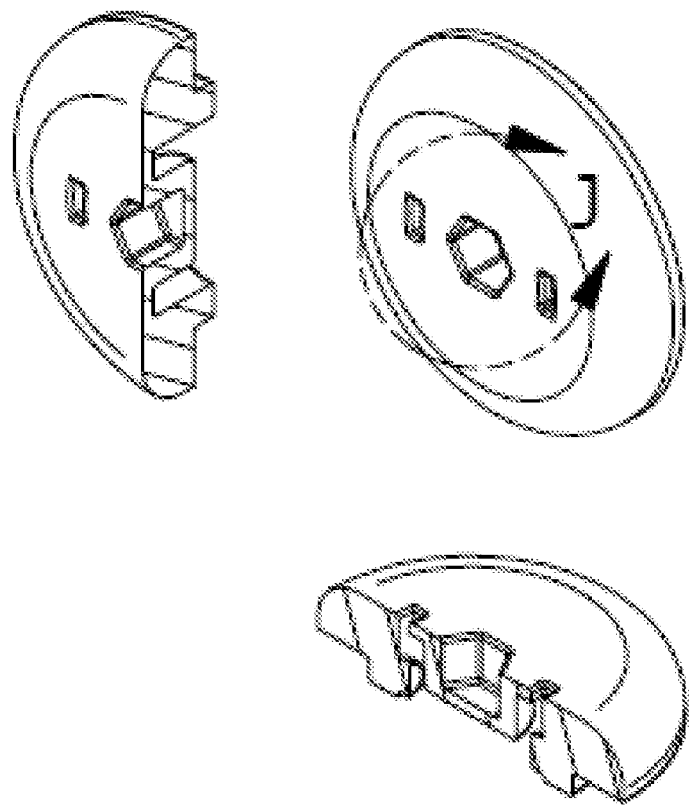
FIG. 41 is a perspective and cut away view of a retaining/tensioning nut.

FIG. 41 is a perspective and cut away view of a retaining/tensioning nut.

Figure 42:
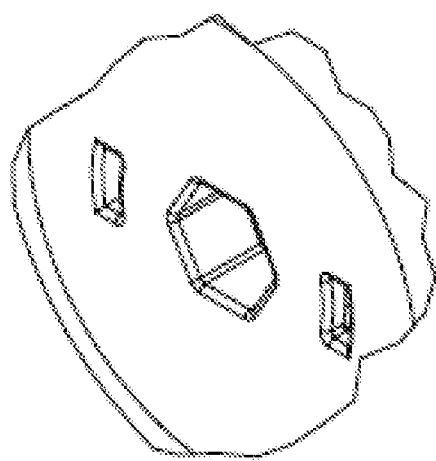
FIG. 42 is a perspective and cut away view of a retaining/tensioning nut.

FIG. 42 is a perspective and cut away view of a retaining/tensioning nut.

Figure 43:
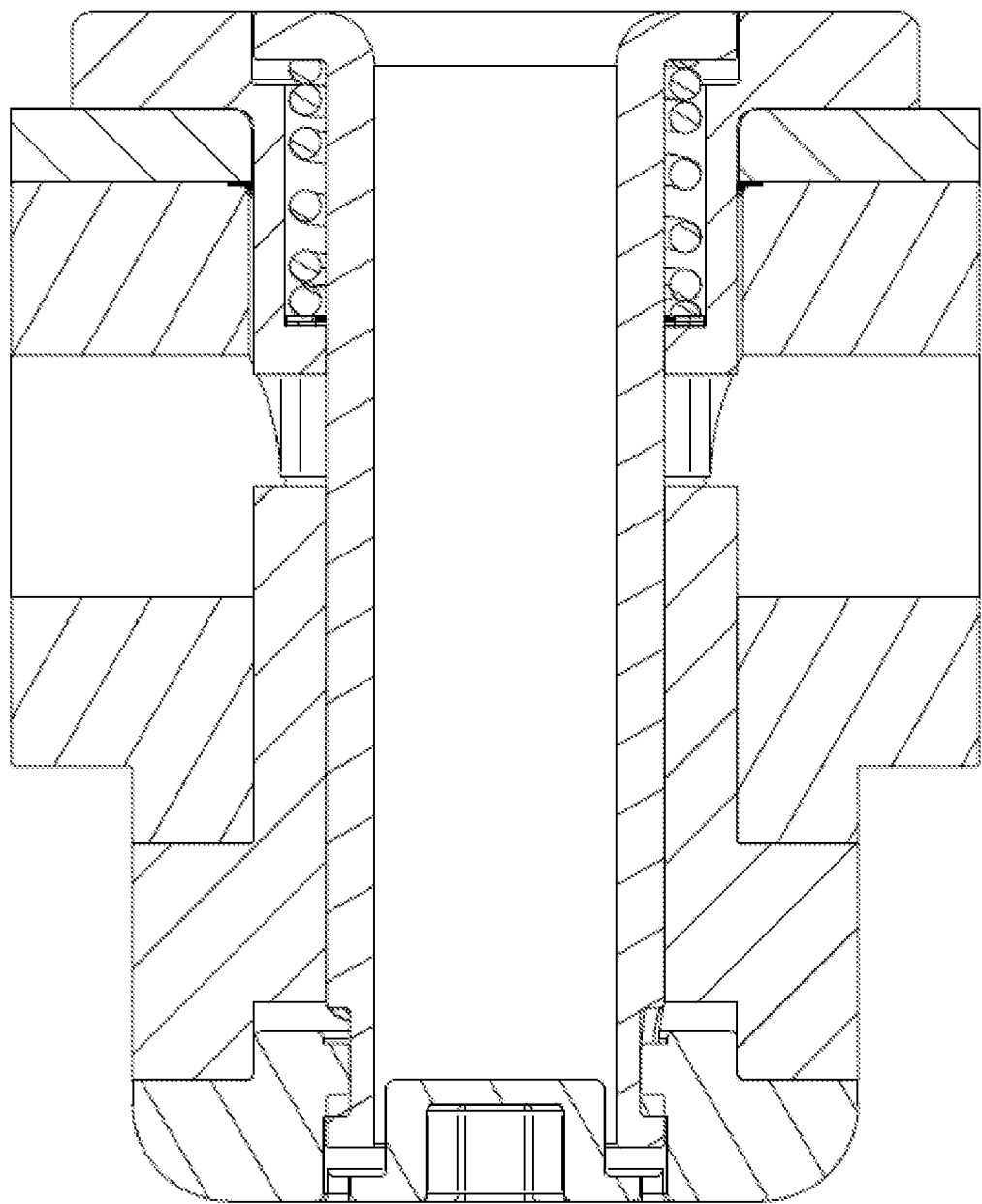
FIG. 43 is a side, cross sectional view of an articulating bracket that shows clearances that enable rib/slot axial movement.

FIG. 43 is a side, cross sectional view of an articulating bracket that shows clearances that enable rib/slot axial movement. A retaining nut features two round pins the interface firstly with match pairs of shaped slots found on one end of the hollow, flanged shaft. A tensioning force supplied by the spring cause the round pins to slide up and are rotated clockwise over a ridge, and, due to the force of the spring, when released, the round pins snap back into a recess. At this stage of the retaining nut's rotation the assembly is free to move slightly as attested by the gap. When the tensioning nut is rotated further the round pins are forced along a spiral ramp until they meet another slot at which point the round pins drop into the slot, thereby locking the assembly together causing the gap to disappear.

Figure 44:
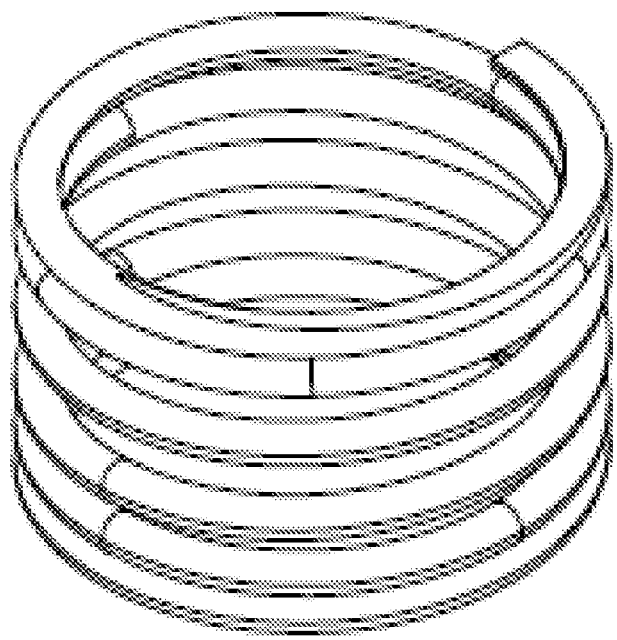
FIG. 44 is a perspective view illustrating the tensioning spring.

FIG. 44 is a perspective view illustrating the tensioning spring.

While various embodiments of the invention have been described, it will be apparent to those of ordinary skill in the art that many more embodiments and implementations are possible that are within the scope of this invention.

What is claimed is:

1. A mounting bracket for a loudspeakers system comprising:
    a tube shaped member connected to a sliding collar;
    a spring engaged with the tube shaped member; and
    a cradle engaged with the sliding collar and positioned on a knuckle that can rotate and change a roll axis and a pitch axis,
    wherein the knuckle is T shaped to provide the roll and pitch axes of the knuckle, and the knuckle includes a ribbed and slotted surface on an outside annular surface of the pitch axis of the knuckle and wherein the cradle includes a ribbed and slotted surface on an inside surface of the cradle.

2. The mounting bracket of claim 1, further including:
    a support bracket that engages with the knuckle.

3. The mounting bracket of claim 2, wherein the knuckle includes a roll axis through hole.

4. The mounting bracket of claim 3, wherein the support bracket includes a hollow round shaft through which the knuckle is engaged by inserting the hollow round shaft of the support bracket into the roll axis through hole of the knuckle.

5. The mounting bracket of claim 1, wherein the ribs and slots of the knuckle are closely mated to the ribs and slots of the cradle.

6. The mounting bracket of claim 5, wherein the spring applies a tension to the mated knuckle and cradle.

7. The mounting bracket of claim 6, wherein a force larger than the force of the spring applied to the mated knuckle and cradle allows adjustment of the pitch and roll of the mounting bracket.

8. A mounting bracket for a loudspeakers system comprising:
   a tube shaped means for positioning the mounting bracket, the tube shaped means connected to a sliding collar;
   a spring means for applying a tension, the spring means engaged with the tube shaped means;
   a cradle means for maintaining an axial position of a knuckle, the cradle means engaged with the sliding collar and positioned on the knuckle that can rotate and change a roll axis and a pitch axis; and
   a support means for mounting to a surface, the support means engaged with the knuckle,
   wherein the knuckle is T shaped to provide the roll and pitch axes of the knuckle, and the knuckle includes a ribbed and slotted surface on an outside annular surface of the pitch axis of the knuckle and wherein the cradle means includes a ribbed and slotted surface on an inside surface of the cradle means.

9. The mounting bracket of claim 8, the knuckle including a roll axis through hole.

10. The mounting bracket of claim 9, wherein the support means includes a hollow round shaft through which the knuckle is engaged by inserting the hollow round shaft of the support means into the roll axis through hole of the knuckle.

11. The mounting bracket of claim 8, wherein the ribs and slots of the knuckle are closely mated to the ribs and slots of the cradle means.

12. The mounting bracket of claim 11, wherein the spring means applies the tension to the mated knuckle and cradle means.

13. The mounting bracket of claim 12, wherein a force larger than the force of the spring means applied to the mated knuckle and cradle means allows adjustment of the pitch and roll of the mounting bracket.

14. The mounting bracket of claim 8, the support means further is attached to a loudspeaker.

15. A system for positioning a mounting bracket comprising:
   a tube shaped member connected to a sliding collar;
   a spring engaged with the tube shaped member;
   a cradle engaged with the sliding collar and positioned on a knuckle that can rotate and change a roll axis and a pitch axis enabling the mounting bracket to be positioned;
   a support bracket engaged with the knuckle;
   a retaining nut rotationally engaged with the tube shaped member on an end of the tube shaped member; and
   at least two interface pins on the retaining nut that correspond to at least two slots on the end of the tube shaped member,
   wherein the retaining nut applies a tension along the tube shaped member to maintain the mounting bracket position.

* * * * *